July 12, 1960 J. H. ROHLFS 2,944,466
PROFILE MILLING MACHINE
Filed Dec. 23, 1958 4 Sheets-Sheet 1

FIG. I

INVENTOR
JOHN H. ROHLFS
BY *Francis J. Klempay*
ATTORNEY

INVENTOR
JOHN H. ROHLFS

July 12, 1960  J. H. ROHLFS  2,944,466
PROFILE MILLING MACHINE
Filed Dec. 23, 1958  4 Sheets-Sheet 3

INVENTOR
JOHN H. ROHLFS
BY Francis J. Klempay
ATTORNEY

INVENTOR
JOHN H. ROHLFS
BY Francis J. Klempay
ATTORNEY

# 2,944,466

PROFILE MILLING MACHINE

John H. Rohlfs, Winsted, Conn., assignor to The McKay Machine Company, Youngstown, Ohio, a corporation of Ohio Filed Dec. 23, 1958, Ser. No. 782,510

12 Claims. (Cl. 90—13)

The present invention relates generally to the machine tool and metal working arts and more particularly to the provision of an improved profile milling machine which is adapted to very accurately and automatically mill almost any desired shape on the end face of a metal workpiece, such as a metal bar, rod or the like.

In my prior United States Patent No. 2,826,963, which issued March 18, 1958, and which is assigned to the assignee of the present invention, there is disclosed and claimed a milling machine which is particularly well adapted to cut arcuate and rounded faces on metal workpieces for use as shaft keys, chain links, etc. Prior to the development of this machine it was necessary for a machinist to resort to the time consuming and relatively inaccurate procedure of first scribing the end of a metal workpiece, sawing the workpiece along the scribe line and then grinding or filling the rough rounded edges to finish the shaft key or the like. However, by employing the machine disclosed in my above identified patent it is possible to very accurately and precisely machine rounded faces on the ends of metal workpieces in a fast and efficient manner without the requirement of the machinist holding either the workpiece or the cutting tool. This patent is made of record for those desiring a more detailed description of such a milling machine and the patent coverage thereon.

Although a milling machine constructed in accordance with the teachings of the above identified patent is exceptionally well adapted for cutting arcuate or rounded end faces on metal workpieces, it is often necessary to provide a metal workpiece, such as a bar or a rod, for example, with an end face of some complex shape other than round. Consequently, the need exists for a milling machine of the type disclosed in my prior patent which is adapted to accurately mill the end faces of metal workpieces to complex shapes.

In view of the above, it is the primary or ultimate object of the present invention to provide an improved profile milling machine which is adapted to mill almost any desired shape on the end face of a metal workpiece.

A further object of the invention is to provide a profile milling machine which is adapted to mill complex shapes on the end faces of metal workpieces with a very high degree of precision and accuracy. As will be hereinafter more fully apparent, the milling cutter of the profile milling machine of the present invention is journaled for rotation about its own axis in a spindle housing which is in turn slidably mounted on a support plate for longitudinal movement. The support plate is rotatably mounted with respect to the vice provided for holding the metal workpiece and cam means are employed to move the spindle housing longitudinally in accordance with a predetermined pattern as the support plate is rotated whereby the milling cutter cuts the end face of a metal workpiece held by the vice to the desired complex shape. The resultant complex shape of the machined end of the workpiece is determined by the cam means and, as will be hereinafter more fully explained, the cam means is of much larger size and length than the path taken by the milling cutter in machining a complex end face on a metal workpiece. Thus, the cam means, being of a relatively large size, can be easily and accurately made whereby the end face cut on the metal workpiece will be very precise and accurate or, conversely, any small errors in the shape of the cam means will not be evidenced on the milled complex shaped end face of a metal workpiece.

Another object of the present invention is to provide a profile milling machine for cutting complex shaped end faces on metal workpieces which is also adapted to cut rounded and arcuate faces on the end faces of metal workpieces. The profile milling machine embodies means for rendering the cam means for slidably moving the spindle housing inoperative and means to lock the spindle housing in offset relation with respect to the center axis of the vice whereby when the support plate is rotated the milling cutter travels in a circular path.

Still another object of the invention is to provide a profile milling machine of the type above described which is characterized by its extreme flixibility and versatility. As mentioned above, the profile milling machine is adapted to machine or profile almost any shape, including the special case of a round or arcuate shape, on the end faces of metal workpieces. Also, the cam means is adapted to be readily removed and replaced whereby the shapes machined on the end faces of metal workpieces can be changed very quickly and with a minimum of effort.

Yet a further object of the invention is to provide an improved profile milling machine for milling any desired complex shape on the end face of a metal workpiece which is automatic in overall operation. Both the milling cutter and the support plate are driven by adjustable motor means and positioning means are included whereby all the operator is required to do is place a metal workpiece in the vice, operate a valve to close the vice and then initiate control means to start the milling operation. In this respect it will be noted that the machinist is not required to hold either the workpiece or the milling cutter and that the machine is adapted to handle various sizes of metal workpieces without complicated and time-consuming "set-up" operations. Also, the profile milling machine of the present invention is ideally adapted for automatic control in such a manner that the same may be operated by relatively unskilled labor. This, of course, is important in the highly skilled and highly paid machinists can be freed for other more important tasks while yet more accurate complex shaped end faces on metal workpieces are machined in a much shorter time.

Another important aspect of the present invention is the provision of an improved gauge for use with the profile milling machine which is adapted to accurately position the end face of the metal workpieces with respect to the path of travel of the milling cutter. The gauge is adjustable to accommodate various sizes of metal workpieces and is preferably employed in such a manner that only a minimum of metal is cut from the end faces of the metal workpieces.

Other objects of the present invention are to provide a profile milling machine ideally suited for milling or profiling complex shapes on the end faces of metal workpieces which is characterized by simplicity and low cost of manufacture and assembly, ruggedness and rigidity whereby the same is adapted to withstand continuous usage, and which has many inherent safety features.

The above, as well as other objects and advantages of the present invention, will become more readily apparent upon consideration of the following specification and accompanying drawing wherein there is disclosed a preferred illustrated embodiment of a profile milling machine constructed in accordance with the teachings of the present invention.

Figure 1:
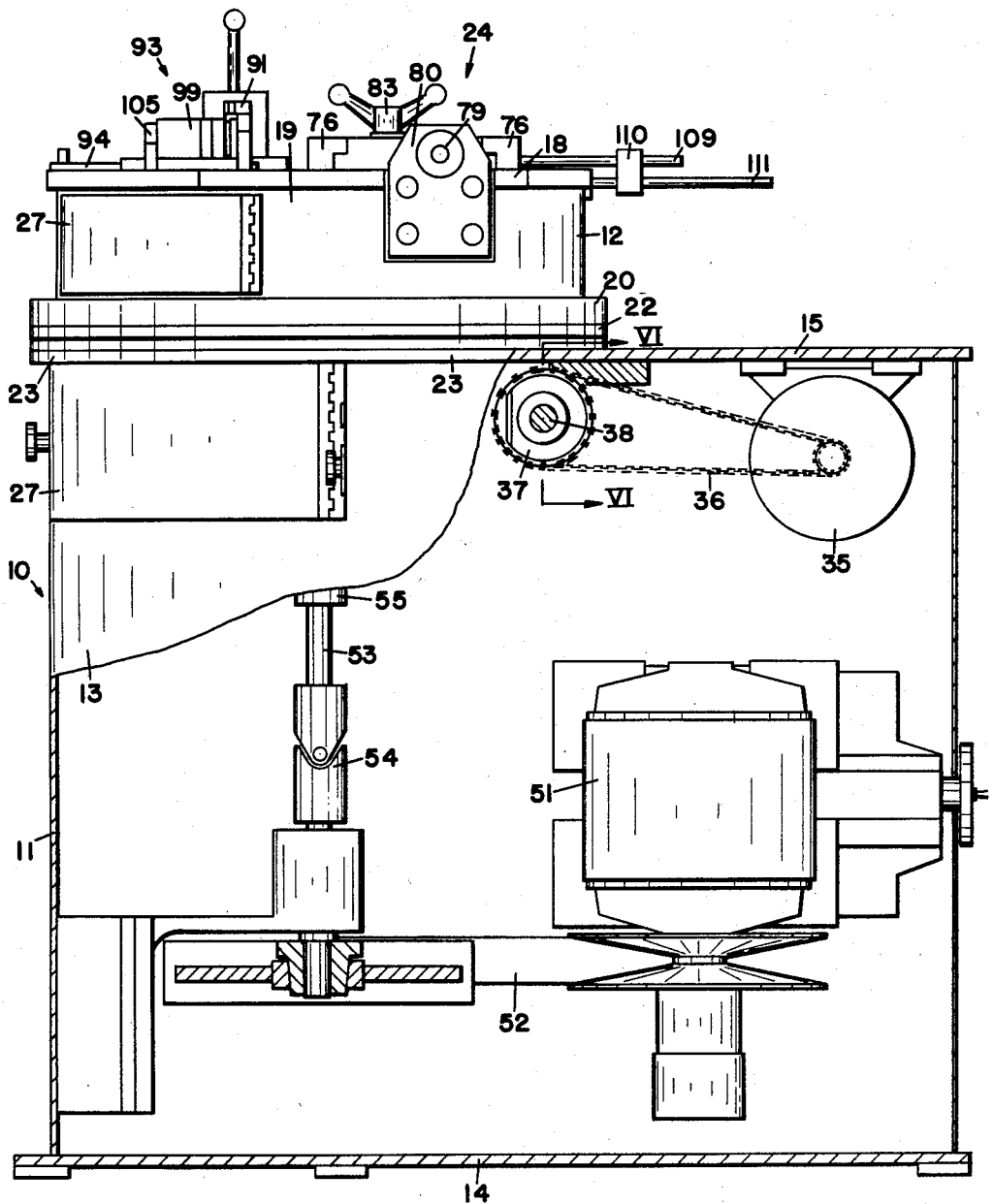
Figure 1 is a side view, partially in section, showing an improved profile milling machine for accurately and automatically milling almost any desired shape on the end faces of metal workpieces constructed in accordance with the teachings of the present invention.

Referring now to the drawing, and initially to Figures 1–5 thereof, there is shown a profile milling machine constructed in accordance with the teachings of the present invention which comprises a housing, designated generally by the reference numeral 10. The housing 10 includes a generally rectangular and vertically extending lower housing section 11 and a generally cylindrical upper housing section 12. The lower housing section 11 has a rounded front end portion 13, a bottom wall 14 providing a floor base and a top wall 15 defining a supporting surface for the upper housing section 12. The top wall 15 of the lower housing section 11 has a large circular opening 16 therein adjacent the rounded front end portion 13 and this large circular opening is bounded by a circumferential flange portion 17 of the top wall 15. The upper housing section 12 is of smaller size than the lower housing section 11 and, as mentioned above, is generally cylindrical. The upper housing section 12 comprises a flat top wall 18 that defines a workpiece supporting table or bed, a cylindrical side wall 19 and a cricumferential flange 20 at the lower end of the side wall 19. The upper housing section is attached to the lower housing section by means of a plurality of circumferentially spaced and vertically extending bolts 21 that extend through the circumferential flange 20 of the upper housing section, a stationary and circumferential upper bearing race 22, a stationary and circumferential lower bearing race 23 and the circumferential flange portion 17 of the top wall 15 of the lower housing section. In this manner of construction an extremely rigid housing of an overall neat appearance is provided.

The workpiece supporting table or bed 18 has a vice 24 mounted thereon which is adapted to firmly hold a metal workpiece, not particularly shown, during milling operations as will be hereinafter more fully described. The workpiece supporting table 18 has a central aperture 25 therein through which projects a vertically orientated milling cutter 26. The milling cutter 26 is supported and driven by means to be hereinafter more fully described whereby the same is rotated about its own vertical axis while at the same time being moved in a complex circular path or orbit to mill the desired complex shape on the end face of a workpiece held by the vice 24. The supporting and driving means for the milling cutter 26 are contained within the housing 10 and suitable doors 27 are provided in both the upper and lower housing sections to allow ease of access to these means.

Figure 4:
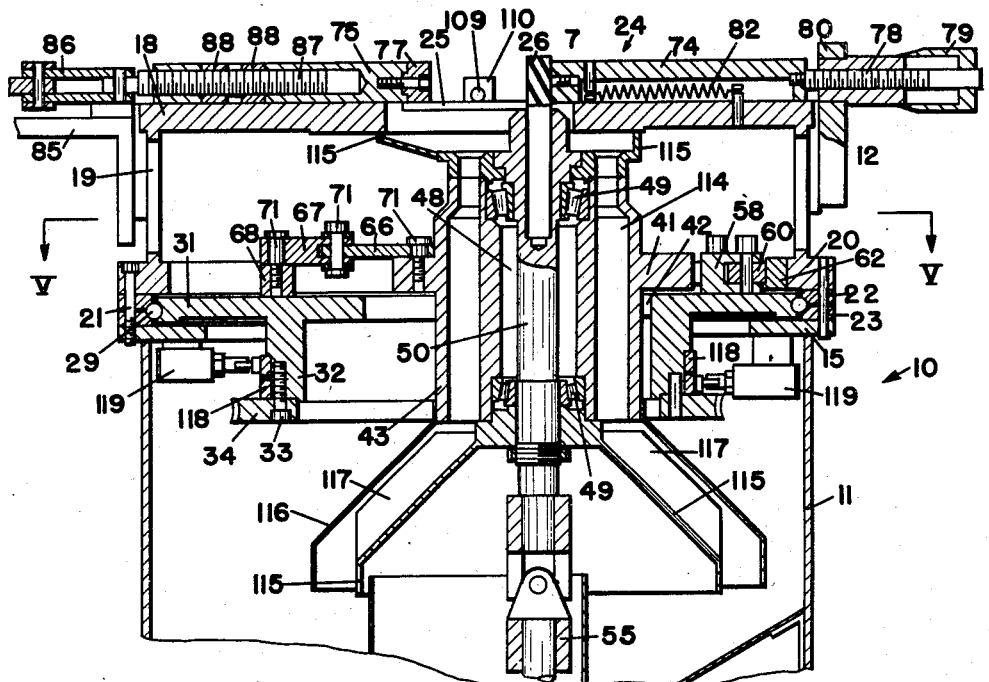
Figure 4 is a side sectional view of the apparatus of Figure 2 as seen from the section line IV—IV.
Figure 5:
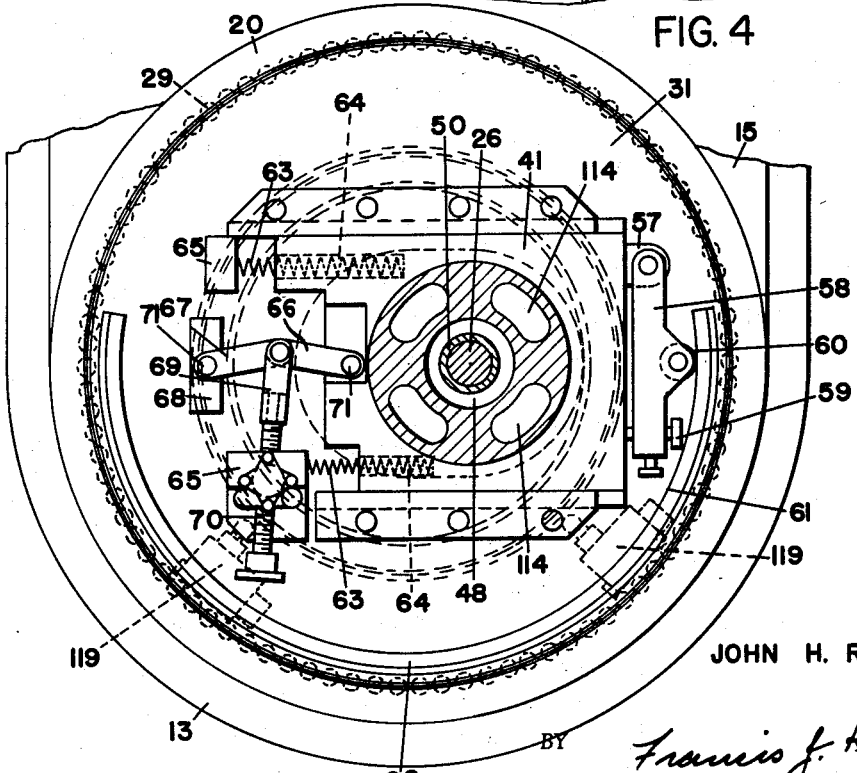
Figure 5 is a plan sectional view taken along the section line V—V of Figure 4.
Figure 3:
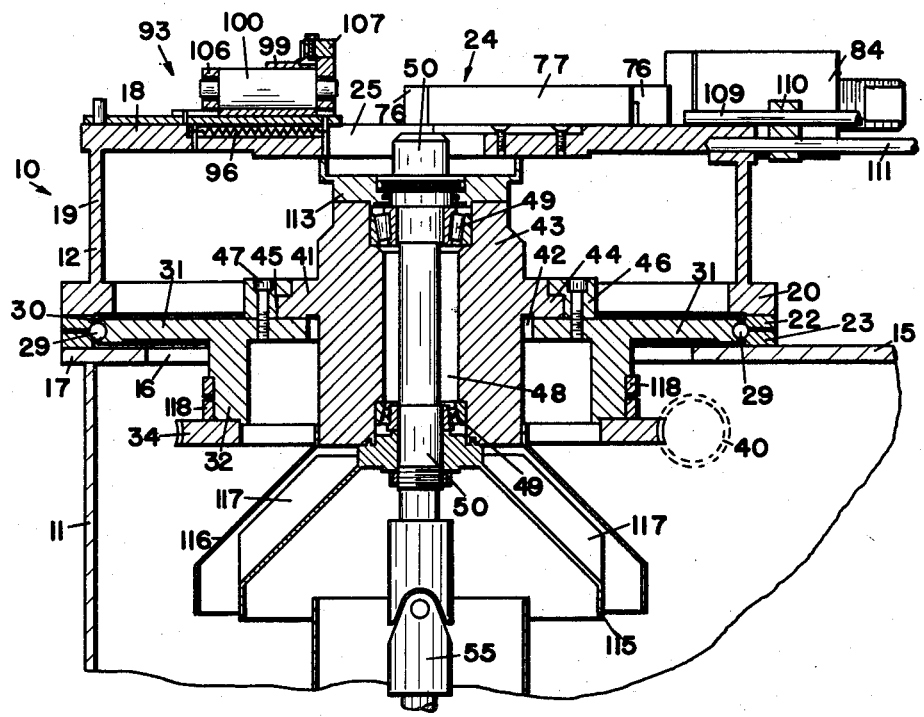
Figure 3 is a side sectional view taken along the section line III—III of Figure 2.
Figure 7:
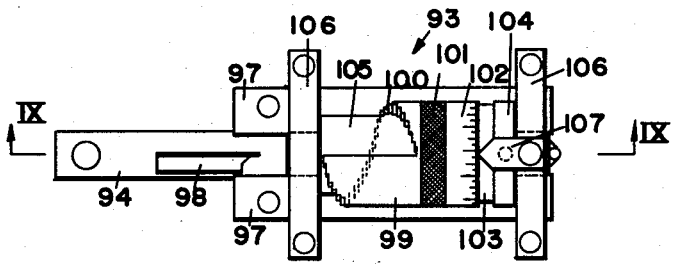
Figure 7 is an enlarged plan view showing specifically the improved metal workpiece gauge embodied in the profile milling machine of the present invention.
Figure 8:
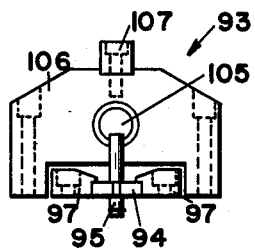
Figure 8 is an end view of the gauge shown in Figure 7.
Figure 9:
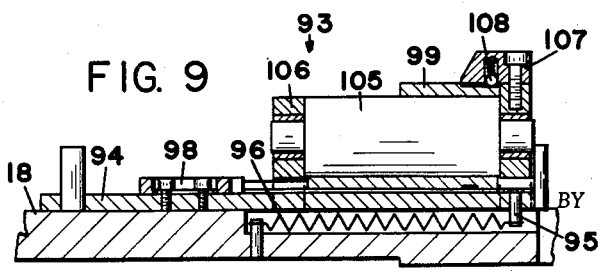
Figure 9 is a side sectional view of the gauge as seen from the section line IX—IX of Figure 7.

Considering first the supporting and driving means for the milling cutter 26, it will be noted in Figures 3, 4 and 5 of the drawing that the upper and lower stationary and circumferential bearing races, 22 and 23, respectively, provide the outer race for a great number of circumferentially disposed ball bearings 29. The inner or movable race for the ball bearings 29 is defined by the outer peripheral edge 30 of an annular support plate 31. The annular support plate has an integral depending cylindrical portion 32 to which is attached by means of bolts 33 a ring gear 34. The ring gear 34 is adapted to be driven through the drive shown in Figure 6 of the drawing by an adjustable variable speed electric motor 35. It should be apparent that the support plate 31, as well as all apparatus mounted thereon or movable therewith, is supported by the ball bearing 29 for relatively friction free rotative movement upon energization of the electric motor 35.

Figure 6:
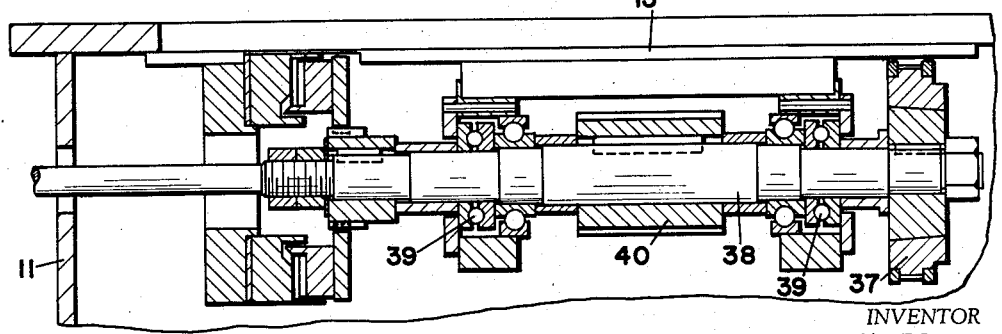
Figure 6 is a side sectional view as seen from the section line VI—VI of Figure 1 showing specifically the driving means for the support plate.

As shown in Figures 1 and 6 of the drawing, the electric motor 35 is attached to the underside of the top wall of the upper housing section 11 and is adapted to rotate, by means of an endless chain 36, a sprocket 37. The sprocket 37 is mounted on one end of a shaft 38 that is journaled by a plurality of bearing assemblies 39 which are in turn mounted from the underside of the top wall 15 of the lower housing section in the manner shown. Keyed to the shaft 38 intermediate the bearing assemblies 39 is a worm gear 40 that meshes with the ring gear 34 carried by the support plate 31. Thus, the arrangement is such that upon proper energization of the electric motor 35 the worm gear 40 will be rotated to rotate the ring gear 34 to cause relatively friction free rotation of the support plate 31 in a horizontal plane.

The support plate has a central aperture 42 therein through which protrudes a vertically disposed relatively large diametered spindle housing 43. The spindle housing 43 extends above and below the support plate 31 and is provided with a generally rectangular enlargement 41 intermediate the ends thereof whose side edges define a pair of laterally projecting slides 44 which are received within ways 45 defined by a pair of parallel spaced L-shaped gibs 46. The gibs are attached by bolts 47 to the support plate 31 on opposite sides of the aperture 42. It should be apparent that in this manner the spindle housing 43 is carried by and adapted to be rotated with the support plate 31 but is also adapted to be slidably moved with respect thereto. Means, to be hereinafter more fully explained, are employed for slidably moving the spindle housing with respect to the support plate 31 as the latter is rotated whereby the milling cutter travels in an exact predetermined pattern to mill the end face of a metal workpiece to a desired complex shape.

The spindle housing 43 is centrally bored throughout its length at 48 and journaled within the central bore 48 by a pair of vertically separated thrust bearing assemblies 49 is a cutter spindle 50. The top end of the cutter spindle 50 is countersunk to provide a chuck and received within this chuck is the milling cutter 26 that protrudes through and above the central aperture 25 in the surface of the workpiece supporting table 18. The means for rotating or driving the spindle 50 comprises an adjustable variable speed electric motor 51 adjustably mounted on a shelf in the bottom portion of the lower housing section and which is connected to the cutter spindle by a belt drive 52 and a flexible shaft 53. The flexible shaft 53 is made up of a plurality of interconnected pin and socket linkages 54 and 55, the uppermost of which is connected to the cutter spindle 50. The extended length of the flexible shaft 53 will vary as the cutter spindle moves in a circular path to allow the milling cutter to profile the end face of a metal workpiece but the driving connection between the electric motor 51 and the milling cutter will be maintained at all times. The electric motor 51 is operative to rotate the milling cutter about its own axis while the electric motor 35 is operative to rotate the support plate 31 to move the milling cutter in a circular path for the purposes above set forth. The electric motors 35 and 51 are both adjustable whereby a cutting speed and a speed of movement of the milling cutter best adapted for any desired end face can be selected.

As mentioned above, the spindle housing 43 is slidably mounted on the support plate 31 and the sliding movement of the spindle housing with respect to the support plate as the support plate is rotated will determine the path of movement taken by the milling cutter. As is clearly shown in Figures 4 and 5 of the drawing, one end of the spindle housing has a forwardly projecting link 57 to which is pivotally attached one end of a cam roll mounting block 58. The other end of the cam roll mounting block is held in adjustable spaced relation with respect to the spindle housing 43 by means of a headed cam follower adjusting screw 59. Rotatably mounted intermediate the ends of the cam roll mounting block 58 is a cam follower roll 60 that engages the cam surface 61 of a generally segmental cam 62. The cam 62 is stationarily attached to the circumferential flange 20 of the upper housing section 12 and extends through an arc of slightly more than one hundred and eighty degrees. The shape of the segmental cam surface 61 is selected to produce a sliding motion on the part of the spindle housing as the same is rotated with the support plate 31 to move the milling cutter in the desired path of travel.

For biasing the cam follower roll 60 into engagement with the segmental cam surface 61 of the cam 62 there are provided a pair of compression coil springs 63 which are received within recesses 64 in the spindle housing and bear against spaced blocks 65 mounted on the upper surface of the support plate 31. The compression coil springs 63 always keep the cam follower roll 60 in pressure contact with the cam surface of the segmental cam whereby variations in the cam surface are faithfully reproduced by the milling cutter as the support plate is rotated.

As set forth in the objects of the invention, the profile milling machine also comprises means for rendering the cam means inoperative and locking the spindle housing in offset relation with respect to the axis of the support plate whereby the profile milling machine is adapted to very accurately and precisely cut rounded or arcuate shapes. Such means includes a pair of links 66 and 67 which are pivoted at one of their ends to the spindle housing 43 and a block 68 attached to the support plate 31, respectively, and at their other ends to each other and the end of an operating link 69. The other end of the operating link threadably receives the forward end of a headed adjusting screw 70 which is threadably mounted in and extends through one of the spaced blocks 65. The above apparatus provides, in essence, a rigid but adjustable toggle linkage interconnecting the spindle housing and the support plate. During normal operation of the profile milling machine, when the same is adapted to mill a complex shape on the end face of a metal workpiece, the toggle linkage would be disconnected from the spindle housing and/or the support plate by removing one or more of the plurality of pins 71 which pivotally join and mount the various links 66 and 67. When the pins 71 are removed the rigid interconnection between the spindle housing and the support plate is broken whereby the spindle housing can move longitudinally in a horizontal plane relative to the support plate as the same is rotated in accordance with the shape of the segmental cam. However, when it is desired to mill a rounded or arcuate end face on the end of a metal workpiece, the segmental cam and/or the cam follower roll are removed and the pins 71 are inserted to provide the rigid connection between the support plate and the spindle housing. In this manner the cam means is no longer effective to slidably move the spindle housing as the support plate is rotated and the spindle housing will remain fixed relative to the support plate. The distance that the axes of the spindle housing and miller cutter are offset with respect to the vertical axis of rotation of the support plate will determine the radius through which milling cutter will be moved. To change this off center distance it is only necessary to manipulate the headed adjusting screw to lengthen or shorten the effective length of the toggle linkage and in this manner the profile milling machine is adapted to very accurately machine rounded or arcuate end faces on metal workpieces. Of course, the same result could be obtained by utilizing a segmental cam having a segmental cam surface which will not move the spindle housing with respect to the support plate as the latter is rotated but it is preferred that the adjustable toggle linkage be employed when rounded and arcuate end surfaces are to be machined due to the inherent accuracies thereof.

One of the primary advantages of the profile milling machine of the present invention is the very high degree of accuracy that is obtainable therewith. The adjustable toggle linkage allows round and arcuate shaped end faces to be milled with high precision as is set forth above. It will be noted that the segmental cam is positioned about the internal surface of the upper housing section a substantial distance radially outward of the path of travel of the milling cutter whereby the size and length of the cam surface is much larger than that of the path through which the milling cutter moves. Since the segmental cam is quite large the cam follower roll is adapted to follow the same in an accurate manner even when highly complex shapes are being milled. Also, the cam surface may be generated and machined with relative ease to a high degree of accuracy because of the large size thereof. Further, any small inaccuracies in the cam surface will not be evidenced on the milled end faces of metal workpieces because of the large reduction in movement between the cam follower roll and the milling cutter. It is, of course, necessary to provide a different cam for each complex shape to be milled and the mounting of the cam on the internal surface of the upper housing section is such that the segmental cam is easily and readily accessible for removal and/or replacement in a minimum of time.

Considering now the construction of the vice 24 used to hold a metal workpiece on the workpiece supporting table 18 during milling operations, there are provided a pair of jaws 74 and 75 which are respectively mounted for rectilinear reciprocation on opposite sides of and toward and away from a center line of the profile milling machine extending from the front to rear thereof. The jaws are substantially flat plate-like blocks and such rectilinear reciprocation is accomplished by providing for each of the jaws a pair of spaced parallel gibs 76 that are attached to the workpiece supporting table and define spaced ways for slidably receiving and guiding the side edges of the jaw associated therewith. Each of the jaws 74 and 75 has a face plate 77 attached by studs and bolts to the inner face thereof adjacent the other of the jaws. The jaws 74 and 75 and their respective face plates are so arranged that a metal workpiece, such as a bar, rod or the like, may be clamped with its center line on the center line of the machine and with the front end of the workpiece disposed over the opening 25 through which the milling cutter 26 projects to engage the end of the workpiece.

As set forth above, both of the jaws are adapted for rectilinear reciprocation but the jaw 74 is normally maintained in relative fixed relation with respect to the workpiece supporting table and the jaw 75 and the position thereof is adjusted only when the size of the workpieces changes. The jaw 75, however, is adapted for reciprocation during normal usage thereof to alternately clamp a workpiece against the other jaw 74 and to release a milled workpiece for removal.

The means for adjustably moving the jaw 74 comprises a threaded rod 78 which is attached to the rear end of the jaw 74 and is threadably received in a manipulating fixture 79 mounted by a suitable plate 80 attached to the side wall portion of the upper housing section. The arrangement is such that when the manipulating fixture 79 is rotated by the machinist the clamping jaw will move inwardly or outwardly. It is contemplated that the manipulating fixture 79 will be knurled for ease of turning and will be imprinted with suitable indicia representing the correct position of the jaw 74 for any given size of metal workpiece to be machined. When a different size workpiece is to be milled the machinist need only to manipulate the fixture 79 until the pointer is aligned with the indicium corresponding to the dimension of the workpiece and the jaw will be in the correct position for receiving such a workpiece. As shown, a coil spring 82 is provided for biasing the jaw outwardly and a locking handle 83 (see Figure 2) is also provided for positively locking the jaw 74 in any adjusted position. As will be hereinafter more fully explained, the milling cutter and the jaw 74 are so positioned at the start of any milling operation that the milling cutter is tangentially disposed and aligned with the outer surface of the face plate 77 associated therewith and consequently the same relation also exists between the milling cutter and the side surface of a workpiece clamped between the jaws.

For reciprocating the jaw 75 there is provided a vice operating fluid cylinder 84 that is mounted on a suitable mounting block 85 attached to the side wall of the upper housing section. The piston rod of the vice operating fluid cylinder is pivotally attached to a toggle linkage 86 intermediate the ends thereof which extends between the mounting block 85 and the rear end of a threaded rod 87. The threaded rod is received within the mass of the jaw 75 and is adjustable with respect thereto upon manipulation of a pair of clamping nuts 88 that are received on the threaded rod and are exposed through an aperture 89 in the jaw 75. Thus, upon proper actuation of the operating vice cylinder 84 the effective length of the toggle linkage will be increased or decreased to cause the jaw 75 to move into or out of clamping relation with respect to a workpiece and the jaw 74. A pair of stops 90 are attached to the mounting block 85 for limiting outward retractive movement of the jaw 75.

Fluid is supplied to the vice operating cylinder 84 from a suitable source thereof, not shown, through a hand operated valve 91 mounted adjacent the forward end of the workpiece supporting table 18. The valve 91 is of conventional construction and is spring or otherwise biased so that the operating handle of the same must be depressed at all times when fluid is supplied to the vice operating cylinder to move the jaw 75 into clamping relation or to clamp a workpiece. Therefore, one of the machinist's hands must be on the handle of the valve 91 at all times during a milling operation whereby the same is positioned away from the milling cutter. Also, the electrical control equipment for energizing the electric motors may include a push button which must be depressed during the entire milling operation. In this manner both of the machinist's hands are safely positioned away from the milling cutter during milling operations. It is also contemplated that the control apparatus will include interlocking means whereby the milling operation cannot be carried out or completed until or unless the workpiece is firmly clamped in the vice. All of these features provide a machine which is inherently safe to operate and any injury to the machinist using the same is effectively precluded.

As set forth in the objects of the invention, an improved gauge is incorporated for automatically positioning the end of a workpiece with respect to the path of travel of the milling cutter and such structure is shown in Figures 2, 3 and 7–9 of the drawing. As shown, a barrel type of gauge, generally designated by the reference numeral 93, is mounted on the workpiece supporting table in front of the jaws and the milling cutter in alignment with the center line of the machine. The barrel gauge comprises an elongated and movable sliding stop 94 whose forward face forms an abutment stop or positioning surface for the forward end face of a metal workpiece when this member is in its extended position. The sliding stop 94 has a depending pin 95 mounted on the underside and adjacent the forward end thereof which receives one end of a coil spring 96. The coil spring 96 extends between the pin 95 and a similar pin received in a recess in the surface of the supporting table 18 and serves to bias the sliding stop for movement in a direction away from the vice and the workpiece. The sliding stop 94 is guided for movement by a pair of spaced parallel gibs 97 that define ways for the reception of the side edges of the sliding stop. The coil spring 96 biases the sliding stop in such a manner that the pin in the forward end thereof is normally maintained in engagement with the forward face of the forwardmost housing 106.

Bolted to the top surface of the sliding stop adjacent the rear end thereof is a follower member 98 having a forwardly extending projection which is adapted to engage the stepped helical of spiraling end surface of a ratchet stop cylinder 99 upon forward movement of the sliding stop 94. The rachet stop cylinder 99 is generally cylindrical and has the rear edge formed in the shape of a helix or spiral which is machined to provide a series steps 100 about this end surface. Directly in front of the spiraling end surface of the rachet stop cylinder is a circular knurled portion 101 forming a gripping area for the machinist's hand when it is desired to rotate the rachet stop cylinder. Inscribed on the rachet stop cylinder directly in front of the knurled portion 101 are reference indicia 102 and spaced forwardly of the indicia is a circular peripheral groove 103. Adjacent the end of the rachet stop cylinder is a band of serrations 104.

The rachet stop cylinder 99 is mounted and carried on a shaft 105 whose protruding end portions are journaled for rotation in a pair of spaced generally U-shaped housings 106 which are bolted to the workpiece supporting table of the profile milling machine. It will be noted that the housings 106 nest with respect to the gibs 97 and the sliding stop 94 whereby a neat appearing assembly is provided. Attached to the forwardmost of the housings 106 on the top thereof is an overhanging rearwardly projecting pointer 107 having a recess therein for the reception of a spring pressed ball 108 that is adapted to engage the band of serrations on the forward end of the rachet stop cylinder.

It is contemplated that the individual indicium 102 will correspond to the overall radius through which the milling cutter will be swung during a cutting operation—that is, correspond generally to the off center distance of the milling cutter and spindle housing from the axis of rotation of the support plate. Thus, if it is desired to swing the milling cutter through an arc whose radius is three-quarters of an inch the machinist would turn the rachet stop cylinder until the pointer is over the indicium three-quarters and when the sliding stop is moved so that the follower member engages the spiraling surface of the rachet stop cylinder the forward end of the sliding stop would be so positioned that a minimum amount of material would be cut from the workpiece when the milling cutter is moved through its path of travel. The relation between the steps on the end face of the rachet stop cylinder and indicia is preferably such that only a small amount of material is taken from the center of the workpiece end face when the milling cutter moves in a round or arcuate path—such as, for example, one thirty-second of an inch. When it is desired to position the workpiece the machinist places the same on the workpiece supporting table between the jaws of the vice and then pushes on the rear end of the sliding stop to move the same forwardly against the action of spring 96 until the follower member engages the stepped end surface of the rachet cylinder. The workpiece is then manipulated so that its forward face abuts against the forward end of the extended sliding stop and at this time the workpiece is properly positioned lengthwise with respect to the milling cutter. After the workpiece has been properly positioned the machinist releases the sliding stop and the same is automatically returned to its retracted position under the action of the spring 96. In this manner the sliding stop is automatically retracted to allow the passage of the milling cutter without interfering with the milling operation. The number and size of the steps on the helical or spiral end face of the rachet stop cylinder and the serrations will, of course, determine the number and increment of the changes that can be made in the extended position of the sliding stop.

The remaining components and apparatus of the profile milling machine of the present invention will perhaps best be understood in connection with the overall operation and functioning of the profile milling machine which will now be described. It will be assumed that it is desired to profile the end face of a metal workpiece to a complex shape.

Figure 2:
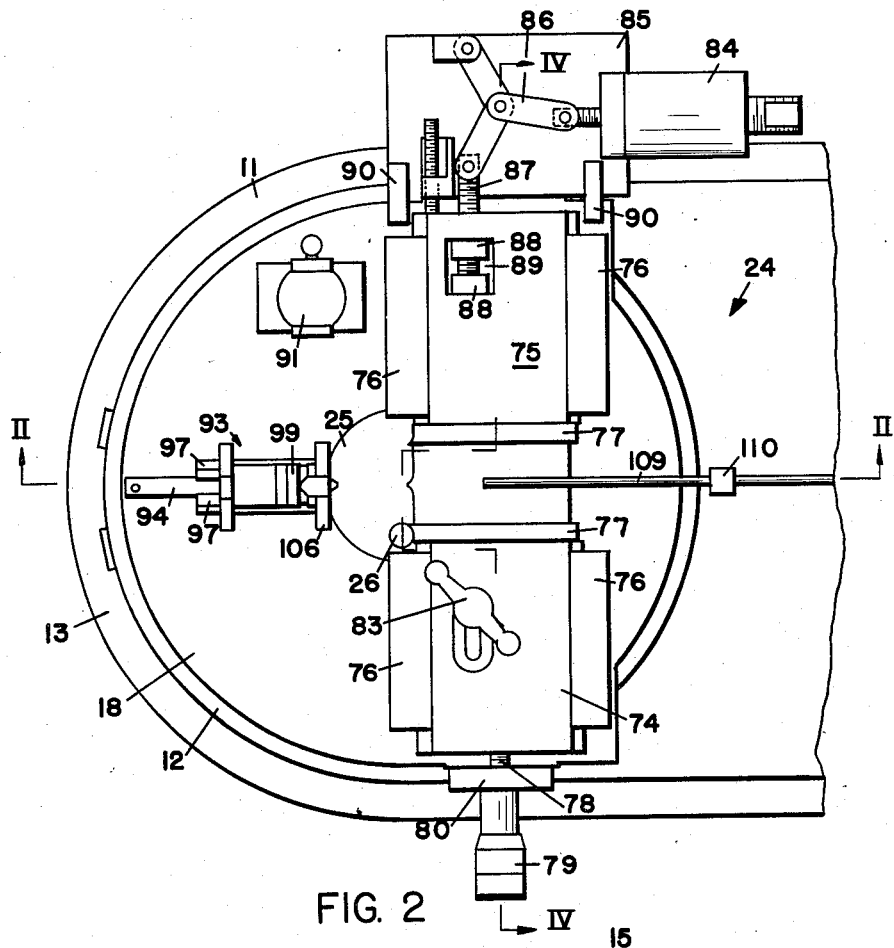
Figure 2 is a plan view of the profile milling machine shown in Figure 1.

In the initial preparation of the profile milling machine, a cam corresponding to the size of workpiece and the desired complex shape is positioned within the upper housing section and the cam follower roll is adjusted to properly engage the same. Of course, since a complex shape is to be machined, the pins 71 are removed from the toggle linkage to disconnect the same from the spindle housing. The machinist then adjusts the jaw 74 of the vice so that the face of the face plate associated therewith is tangentially disposed with respect to the milling cutter as shown in Figure 2 of the drawing and the jaw is locked in this position. Next the machinist manipulates the barrel gauge until the pointer overlies the indicium corresponding to the size of the workpiece to be machined. After these steps are completed the profile milling machine is completely "set-up" and the machinist is ready to begin actual machining operations.

With the vice open, the machinist places a metal workpiece on the supporting table and moves the sliding stop 94 to its extended position and then manipulates the workpiece so that the forward face thereof abuts the tapered front end of the sliding stop 94 and one side edge engages the face plate of the jaw 74. To help the operator position the workpiece a slidable pusher rod 109 is provided which is slidably mounted by a fixture 110 on a guide rod 111 and extends along the center line of the milling machine to the rear of the barrel gauge. The sliding stop 94 is released to return the same to its retracted position and the machinist actuates the valve 91 to supply fluid to the vice operating cylinder 84 whereby the jaw 75 is moved into clamping relation with respect to the workpiece and the jaw 74 to securely clamp the metal workpiece in proper position with respect to the milling cutter.

The machinist is now ready to begin actual milling of the workpiece and a switch associated with suitable electrical control circuits, not shown, is closed to energize the electric motors 35 and 51. The electric motor 51 rotates the milling cutter about its own axis while the electric motor 35 rotates the support plate to move the milling cutter in a circular path or orbit whose exact path is determined by the shape of the segmental cam as described above. As the end face of the workpiece is milled chips and shavings will be thrown off and these chips and shavings will be removed by falling into a chip pan 113 that is attached to the upper end of the spindle housing 43 in such a manner as to cover the opening 25 in the workpiece supporting table in any adjusted or rotated position of the spindle housing. The chips and shavings pass from the chip pan 113 through a plurality of vertical and circumferentially spaced passages 114 in the spindle housing into a chip receiving bin, not particularly shown, in the bottom part of the lower housing section 11. The means for admitting the chips to the chip receiving bin comprises a generally annular inner sheet metal skirt 115 which is secured by a collar to the rotatable cutter spindle 50 and an annular outer sheet metal skirt 116 that is attached to the lower end of the spindle housing 43. A plurality of vanes 117 are attached to the inner skirt 115 for rotation therewith and are pitched to draw the chips through the the vertical passages 114 and to blow the same downwardly into the chip receiving bin.

When the milling cutter reaches a point adjacent the face plate of the jaw 75 the end piece of the metal workpiece will be properly milled to the complex shape desired. The motor 35 can then be reversely energized to move the milling cutter back through its path to its initial starting position adjacent the face plate of the jaw 74 and, after removal of the milled workpiece, the profile milling machine will be ready to mill the end face of another metal workpiece to the desired complex shape.

It is preferred that automatic control circuits be employed with the profile milling machine of the present invention whereby the operation thereof can be controlled in a highly accurate manner by the operator. Although the specific control circuits which may be employed do not form a part of the present invention, one aspect of the profile milling machine in this connection is worthy of note. As shown in Figures 4 and 5, a pair of vertically spaced bands 118 are attached to the outer periphery of the depending cylindrical portion 32 of the support plate 31 which are adapted to be engaged individually by the operators of limit switches 119. The limit switches 119 are mounted from suitable hangers from the flange portion 15 of the top wall of the lower housing section and are adapted to control in some manner the energization or deenergization of the electrical motors 51 and 53. The bands 118 are provided with suitable radially extending rises thereon, not particularly shown, whereby upon predetermined rotation of the support plate 31 the rises engage and deflect the operators of the limit switches 119 to actuate the same to control the electric motors 35 and 51. The position of the limit switches about the periphery of the lower housing section is preferably adjustable and these switches may be employed in the control circuits to define the ends of the path of travel of the milling cutter whereby it is impossible to damage the jaws or face plates of the vice.

If it is desired to mill a rounded or arcuate face on the end of a metal workpiece the machine is "set-up" by removing the cam and/or the cam follower roll and connecting the toggle linkage with the support plate and the spindle housing as above described. The off center distance of the spindle housing is adjusted to correspond to the size of the workpiece to be milled and the milling operation is completed by locking the workpiece in the vice and swinging the milling cutter through a circular arc.

It should thus be apparent that I have accomplished the objects initially set forth by providing a profile milling machine which is adapted to mill almost any desired shape on the end face of a metal workpiece. Although there has been disclosed a preferred illustrated embodiment of the invention it should be apparent that many changes may be made therein without departing from the teachings thereof. As for example, if the workpiece is clamped by vice means supported above the surface of the workpiece supporting table it would be possible to move the milling cutter through a predetermined rotary path of three hundred and sixty degrees to mill the peripheral face of a metal disc or the like. Also, means might be included for varying the height of the milling cutter during its path of travel if desired. Accordingly, reference should be had to the following appended claims in determining the true scope and intent of the present invention.

I claim:

1. A machine for machining the peripheral surface of a workpiece which comprises a lower housing section, an upper housing section, said housing sections each having an annular flange adjacent the other of said housing sections, a circumferential bearing race disposed between said annular flanges, means securing said annular flanges and said bearing race together, a support plate received within said housing sections, a plurality of ball bearings disposed between said circumferential bearing race and the outer periphery of said support plate, means to rotate said support plate, a spindle housing slidably mounted on said support plate for sliding movement in the plane of rotation thereof, a spindle journaled within said spindle housing, said upper housing section having a top wall defining a workpiece supporting table, means to clamp a workpiece to said table, said spindle mounting a machining tool adapted to engage a workpiece held by said means to clamp on said workpiece supporting table, means to rotate said spindle, a generally circular cam secured to the internal surface of said upper housing section radially outwardly of said spindle housing, cam follower means, and means connecting said cam follower means with said spindle housing whereby said spindle housing is caused to move with respect to said support plate when said support plate is rotated.

2. Apparatus according to claim 1 further comprising a disengageable toggle linkage, said toggle linkage adapted to interconnect said spindle housing and said support plate when said cam is removed, means to adjust the effective length of said toggle linkage whereby said spindle housing may be positioned a predetermined off center distance with respect to the axis of rotation of said support plate, and the arrangement being such that when said cam is removed and said toggle linkage is engaged said machining tool is moved in an arcuate path when said support plate is rotated.

3. A milling machine for machining the peripheral surface of a workpiece which comprises means to clamp a workpiece, rotatable support means, means to rotate said rotatable support means, a spindle housing slidably mounted on said rotatable support means in radially disposed relation with respect to said workpiece, a rotatable spindle journaled in said spindle housing and adapted to mount a machining tool for engagement with the peripheral surface of said workpiece held by said means to clamp, means to rotate said spindle, and means to slidably move said spindle housing on said rotatable support means in accordance with a predetermined pattern when said rotatable support means is rotated.

4. Apparatus according to claim 3 further characterized in that said means to slidably move said spindle housing comprises cam means, said cam means comprising a generally circular cam positioned a substantial distance radially outward of said spindle housing, said cam having a cam surface corresponding to the peripheral surface to be machined on said workpiece, cam follower means engaging said cam, and means interconnecting said cam follower means and said spindle housing whereby said machining tool moves in accordance with the shape of said cam when said rotatable support means is rotated.

5. A machine for machining the peripheral surface of a workpiece which comprises means to clamp a workpiece, rotatable support means, a spindle housing slidably mounted on said rotatable support means, a rotatable spindle journaled in said spindle housing and adapted to mount a machining tool for engagement with a workpiece held by said means to clamp, gauge means on said table for properly positioning a workpiece with respect to machining tool, said gauge means comprising a sliding stop adapted to abut against a workpiece, a ratchet cylinder, said ratchet cylinder having a spiralling stepped and surface, means for rotatably mounting said ratchet cylinder, and follower means connected with said sliding stop adapted to engage said spiralling stepped end surface of said ratchet cylinder.

6. Apparatus according to claim 5 further characterized in that said means to rotatably mount said gauge comprises a pair of spaced housings, said housings being mounted on a table, said ratchet cylinder having a circular band of reference indicia intermediate the ends thereof, said ratchet cylinder having a circular band of serrations adjacent the other end surface thereof, a pointer attached to one of said housings and overlying said band of reference indicia, and a spring pressed ball in said pointer engaging said band of serrations.

7. Apparatus according to claim 5 further comprising means to slidably guide said sliding stop, said means to slidably guide comprising a pair of spaced gibs mounted on a table, means to bias said follower means out of engagement with said spiralling stepped end surface of said ratchet cylinder, said means to bias comprising a coil spring received in a recess in said table and extending between said table and the underside of said sliding stop, and said means to rotatably mount comprising a pair of spaced housings secured to said table in nesting relation with said gibs and said sliding stop.

8. A barrel type gauge for use on the workpiece supporting table of a milling machine or the like which comprises a sliding stop adapted to engage and properly position a workpiece, a ratchet cylinder, said ratchet cylinder having a spiralling stepped end face, means for rotatably mounting said ratchet cylinder, and follower means connected with said sliding stop adapted to engage said spiralling stepped end surface of said ratchet cylinder.

9. A machine for machining the peripheral surface of a workpiece which comprises means to clamp a workpiece, rotatable support means, a spindle housing slidably mounted on said rotatable support means radially outwardly of said workpiece, a rotatable spindle journaled in said spindle housing and adapted to mount a machining tool, a toggle linkage, said toggle linkage interconnecting said spindle housing and said rotatable support means, and means to adjustably change the effective length of said toggle linkage to slidably move said spindle housing with respect to said rotatable support means to change the off center distance of the axis of said spindle housing with respect to the axis of rotation of said rotatable support means.

10. A milling machine for machining the peripheral surface of a workpiece which comprises means to clamp a workpiece, rotatable support means, a spindle housing slidably mounted on said rotatable support means outwardly of the center axis thereof, a rotatable spindle journaled in said spindle housing and adapted to mount a machining tool for engagement with a workpiece held by said means to clamp, means to slidably move said spindle housing on said rotatable support means when said rotatable support means is rotated, means to disengage said means to slidably move said spindle housing when said rotatable support means is rotated, and means selectively operative to adjustably lock said spindle housing in offset relation with respect to the axis of rotation of said rotatable support means when said means to slidably move said spindle housing when said means to slidably move said spindle housing when said rotatable support means is rotated is disengaged.

11. A machine for machining the peripheral surface of a workpiece which comprises means to clamp a workpiece, rotatable support means, a spindle housing slidably mounted on said rotatable support means, a rotatable spindle journaled in said spindle housing and adapted to mount a machining tool for engagement with a workpiece held by said means to clamp, means to rotate said rotatable support means, control means for said means to rotate, said control means comprising switch means operated upon rotation of said rotatable support means, a housing, said rotatable support means being journaled in said housing, said switch means comprising at least one limit switch mounted from said housing, said limit switch having an operating arm, and deflecting means carried by said support means adapted to deflect said operating arm of said limit switch upon predetermined rotation of said rotatable support means.

12. A machine for machining the peripheral surface of a workpiece which comprises means to clamp a workpiece, a spindle housing, said spindle housing being positioned outwardly of said means to clamp, a spindle journaled in said housing and adapted to mount a machining tool for engagement with a workpiece held by said means to clamp, means to rotate said spindle about its own axis, means for effecting relative rotational movement of said spindle housing and said means to clamp whereby said workpiece and said machining tool moves relative to each other to machine the peripheral surface of said workpiece, said means for effecting relative rotational movement comprising cam means, said cam means having a cam surface corresponding to the peripheral surface desired on said workpiece, and cam follower means engaging said cam surface.

References Cited in the file of this patent

UNITED STATES PATENTS

| | | |
|---|---|---|
| 2,524,091 | Zimmermann | Oct. 3, 1950 |
| 2,826,963 | Rohlfs | Mar. 18, 1958 |